(12) United States Patent
Mitchell et al.

(10) Patent No.: US 11,059,273 B2
(45) Date of Patent: Jul. 13, 2021

(54) SHRINKABLE LABEL FILMS AND SHRINKABLE LABELS

(71) Applicant: UPM Raflatac Oy, Tampere (FI)

(72) Inventors: Noel Mitchell, Wuppertal (DE); Klaudia Majewska, Bielany Wroclawskie (PL)

(73) Assignee: UPM RAFLATAC OY, Tampere (FI)

( * ) Notice: Subject to any disclaimer, the term of this patent is extended or adjusted under 35 U.S.C. 154(b) by 167 days.

(21) Appl. No.: 15/735,370

(22) PCT Filed: Jun. 13, 2016

(86) PCT No.: PCT/FI2016/050421
§ 371 (c)(1),
(2) Date: Apr. 24, 2018

(87) PCT Pub. No.: WO2016/198751
PCT Pub. Date: Dec. 15, 2016

(65) Prior Publication Data
US 2018/0215127 A1    Aug. 2, 2018

Related U.S. Application Data

(60) Provisional application No. 62/174,575, filed on Jun. 12, 2015.

(51) Int. Cl.
| | | |
|---|---|---|
| *B32B 27/08* | (2006.01) | |
| *B32B 27/30* | (2006.01) | |
| *B32B 27/32* | (2006.01) | |

(52) U.S. Cl.
CPC ............ *B32B 27/08* (2013.01); *B32B 27/308* (2013.01); *B32B 27/32* (2013.01); *B32B 2250/03* (2013.01);
(Continued)

(58) Field of Classification Search
CPC ....... B32B 27/308; B32B 27/32; B32B 27/08; B32B 2307/412; B32B 2323/04;
(Continued)

(56) References Cited

U.S. PATENT DOCUMENTS

2007/0087191 A1* 4/2007 Kaya ................... B65D 23/085
428/343
2009/0061245 A1* 3/2009 Umeda .................. B32B 27/32
428/483
(Continued)

FOREIGN PATENT DOCUMENTS

WO    2009142805 A1    11/2009
WO    2015004315 A1    1/2015

OTHER PUBLICATIONS https://www.hmcpolymers.com/pp-properties (Year: 2012).*
(Continued)

*Primary Examiner* — Samir Shah
(74) *Attorney, Agent, or Firm* — Cantor Colburn LLP

(57) ABSTRACT

The invention relates to a multilayer shrink film capable to shrink under exposure to external energy and a shrink label including said film. According to an embodiment the shrink film includes a first skin layer, a second skin layer and a core layer in between the skin layers, and wherein the core layer includes copolymer of ethylene and butyl acrylate(s) and further heterophasic polypropylene block copolymer(s) or random copolymer(s) of propylene. The invention further relates to a combination of a shrink label and an item.

7 Claims, 5 Drawing Sheets

(52) U.S. Cl.
CPC ....... *B32B 2250/40* (2013.01); *B32B 2270/00* (2013.01); *B32B 2307/412* (2013.01); *B32B 2307/736* (2013.01); *B32B 2323/04* (2013.01); *B32B 2367/00* (2013.01); *B32B 2439/60* (2013.01); *B32B 2519/00* (2013.01)

(58) Field of Classification Search
CPC .......... B32B 2307/736; B32B 2250/40; B32B 2519/00; B32B 2250/03; B32B 2439/60; B32B 2367/00; B32B 2270/00
See application file for complete search history.

(56) References Cited

U.S. PATENT DOCUMENTS

2009/0068486 A1* 3/2009 Blackwell ............. B32B 25/042
428/516

2012/0141732 A1* 6/2012 Patel ....................... B32B 33/00
428/141

OTHER PUBLICATIONS

International Search Report for International Applciation No. PCT/FI2016/050421, Date of Completion: Aug. 26, 2016, dated Sep. 9, 2016, 2 Pages.

Written Opinion of the Internaitonal Searching Authority for International Application No. PCT/FI2016/050421, International Filing Date: Jun. 13, 2016, 5 Pages.

International Preliminary Report on Patentability for International Application No. PCT/FI2016/050421; Date of Mailing: Jun. 27, 2017: Date of Submission of the Demand: Apr. 11, 2017; Date of Completion of Report: Jun. 27, 2017.

* cited by examiner

SHRINKABLE LABEL FILMS AND SHRINKABLE LABELS

CROSS REFERENCE TO RELATED APPLICATIONS

This application is a 371 of International Application No. PCT/FI2016/050421, filed Jun. 13, 2016, which claims the benefit of U.S. Provisional Application No. 62/174,575, filed Jun. 12, 2015, both of which are incorporated herein in their entirety.

FIELD OF THE APPLICATION

The application relates to a shrinkable face film of a label. Especially to a heat shrink face film and labels produced thereof.

BACKGROUND OF THE APPLICATION

It is general practice to apply a label to a surface of an item to provide decoration, and/or to display information about the product being sold, such as the content of the item, a trade name or logo. In addition to pressure-sensitive, wet glue and wrap around labels other labelling technologies are available, for example shrink sleeve labels. Shrink sleeve labels may be provided by forming a tube of plastic film, which may be dropped over an item to be labelled and subsequently fed the item through a shrink-tunnel, such as steam tunnel or hot-air tunnel, at causing the film to shrink and fit the shape of the item.

SUMMARY OF THE APPLICATION

It is an aim of the embodiments to provide a shrinkable face film and a shrinkable label suitable for labelling of an article.

One embodiment provides a multilayer shrink film for a shrink label capable to shrink under exposure to external energy, the multilayer film comprising a first skin layer, a second skin layer and a core layer between the first skin layer and the second skin layer, wherein the core layer comprises copolymer of ethylene and butyl acrylate(s) and further heterophasic polypropylene block copolymer(s) or random copolymer(s) of propylene.

One embodiment provides a shrink label capable to shrink under exposure to external energy comprising a multilayer shrink face film comprising a first skin layer, a second skin layer and a core layer between the first skin layer and the second skin layer, wherein the core layer comprises copolymer of ethylene and butyl acrylate(s) and further heterophasic polypropylene block copolymer(s) or random copolymer(s) of propylene.

One embodiment provides a combination of a shrink label and an item, wherein the shrink label comprises a multilayer shrink film comprising a first skin layer, a second skin layer and a core layer between the first skin layer and the second skin layer, wherein the core layer comprises copolymer of ethylene and butyl acrylate(s) and further heterophasic polypropylene block copolymer(s) or random copolymer(s) of propylene, and wherein the item comprises polyethylene terephthalate.

Further embodiments of the application are presented in the dependent claims.

According to an example, an amount of the copolymer of ethylene and butyl acrylate is between 5 and 50 wt. %, preferably between 5 and 20 wt. %.

According to an example, the core layer comprises the heterophasic polypropylene block copolymer(s) between 50 and 95 wt. %, preferably between 80 and 95 wt. %.

According to an example, the core layer comprises the random copolymer(s) of propylene between 50 and 95 wt. %, preferably between 80 and 95 wt. %.

According to an example, at least one of the first skin layer and the second skin layer comprise propylene terpolymer, random copolymer(s) of propylene or heterophasic polypropylene block copolymer(s) and polyethylene.

According to an example, in the at least one of the first skin layer and the second skin layer the amount of the polyethylene is between 50 and 90 wt. % and the amount of the propylene terpolymer, the random copolymer(s) of propylene or the heterophasic polypropylene block copolymer(s) is between 10 and 50 wt. %.

According to an example, an amount of the copolymer of ethylene and butyl acrylate is between 20 and 50 wt. %, preferably between 30 and 40 wt. %.

According to an example, the core layer comprises the heterophasic polypropylene block copolymer(s) between 50 and 80 wt. %, preferably between 60 and 70 wt. %.

According to an example, the core layer comprises the random copolymer(s) of propylene between 50 and 80 wt. %, preferably between 60 and 70 wt. %.

According to an example, the first skin layer and the second skin layer comprises at least 95 wt. % of heterophasic polypropylene block copolymer(s).

According to an example, the first skin layer and the second skin layer comprises random copolymer(s) of propylene at least 95 wt. %.

According to an example, the first skin layer and the second skin layer comprises propylene terpolymer at least 95 wt. %.

According to an example, the film is uniaxially oriented comprising an uniaxial orientation ratio between 2 and 10.

According to an example, the multilayer shrink film is capable to shrink in the uniaxial orientation direction of the multilayer film between 10 and 40%, when exposed to the external energy comprising temperature range between 65 and 140° C. at an atmosphere comprising low relative humidity. Low relative humidity may be less than 40%.

According to an example, the item is a bottle consisting of polyethylene terephthalate.

DETAILED DESCRIPTION OF THE APPLICATION

Figure 1:
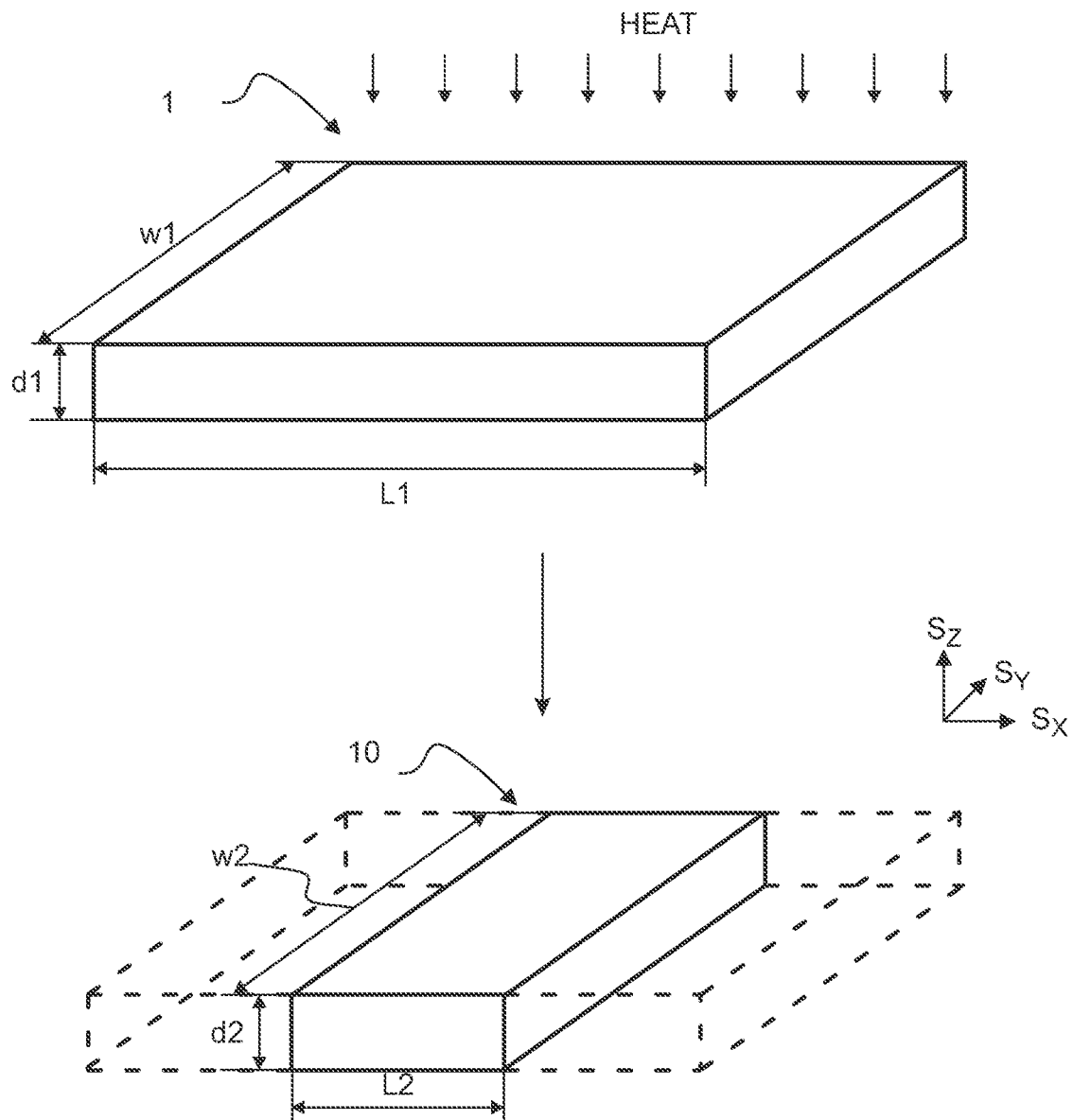
FIG. 1 shows, in a perspective view, an example of heat shrinking of a face film.

In this description and claims, the percentage values relating to an amount of raw materials are percentages by weight (wt. %) unless otherwise indicated. Word "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:
Sx, Sy, Sz 3D coordinates,
TD transverse direction,
CD cross direction,
MD machine direction,
DR draw ratio (stretching ratio)
MRK1 graphics (printing, print layer),
L1 length of a label film prior to shrinking,
w1 width of a label film prior to shrinking,
d1 thickness of a label film prior to shrinking,
L2 length of a shrunk label film,
w2 width of a shrunk label film,
d2 thickness of a shrunk label film,
1 a face film,
2 a first skin layer,
4 a core layer,
6 a second skin layer,
8 a first longitudinal edge of a face film,
10 a shrunk face film,
11 a leading edge of a face film,
12 a second longitudinal edge of a face film,
13 a trailing edge of a face film,
14 a seam,
15 a roll fed shrink film label,
16 a shrink sleeve label,
18 a shrunk label,
20 an item,
22 a labelled item,
23 a neck of a bottle.

A term "label" refers to a piece of material, which is used for labelling of an item. Label may be used to identify something. Label may be attached to an item. In other words, label is suitable to be applied to a surface of an item to provide decoration, and/or to display information about the product being sold, such as content information, a trade name, a logo, a barcode, or any other graphics. The item may be also called as an article, or a substrate. Preferably, the label comprises a face film and at least some graphics on at least one surface of the face film. A face film may also be referred to as a label film. The graphics may comprise, for example, printed information and/or decoration. The graphics, such as printing or other type of visual coatings, may be applied on the face layer (either side) in a single process or via several successive steps. It is also possible that the visual coating include metallic foil or ink or similar.

Labels may be used in wide variety of labelling applications and end-use areas. For example in beverage labelling, food labelling, home and personal care product labelling, and labelling of industrial products. The surface of the labelled item may be plastic, rubber, glass, metal, ceramic, wood, fabric or paper based. The labelled item may be a container, such as a bottle. For example, polyethylene terephthalate (PET) bottle. Alternatively, the labelled item may be a bottle made of polypropylene (PP) or high density polyethylene (HDPE). Or it could be a glass container a metal container. It could also be any other rigid or solid item or items to be combined together. For example in multipacked containers or where you might want to pack multiple items together which are not necessarily containers as such, for example separate blocks.

Term "shrinkable" refers to a property of a face film or a label made thereof to shrink under exposure to external energy. Referring to FIG. 1, a heat shrinkable face film 1 of the invention shrinks when exposed to an elevated temperature. Preferably the shrinking is provided at an atmosphere comprising low humidity (without additional moisture). Shrinking provided at heating tunnel at an atmosphere without additional moisture may be referred to as "dry heating". Dry heating may comprise relative humidity less than 40%. Dry heating may be applied via hot air and/or via infra-red radiation (IR). Hot air may be provided in a hot air tunnel and/or in IR-tunnel comprising temperature, for example between 65 and 140° C. The humidity inside the shrink tunnel is preferably lower than humidity of surrounding atmosphere outside the tunnel. In other words, dry heating is provided without surrounding moisten atmosphere i.e. no additional moisture, such as water steam, exists to enhance the heat transfer. In response to application of heat, the heat shrinkable face film (also referred to as heat shrinkable film) or a label comprising said film is arranged to shrink. Heat shrinkable film may also be referred to as thermally inducible shrinkable film. The heat shrinkable film is able to shrink in the stretching (orientation) direction of the film. Shrinkage may be focused on a local area or to the whole face film or label area. Due to the shrinking effect, in addition to carrying printed information, the shrunk label may also provide certain amount of additional structural support to the labelled items, for example, to a thin walled plastic bottle.

Further, the label material may also provide certain tactile feeling for the end user in addition to the purely visual effects.

In the present application "heat shrink film" or "heat shrink label" refers to a film or label having between 10 and 40% shrinkage at temperature between 65 and 140° C. Shrinking of the film is preferably provided via dry heating without additional moisture to enhance the heat transfer. Below 65° C. shrinkage is less than 10%. In an example, below 50° C. shrinkage is less than 5%. For example, shrinkage may between 0 and 10%, or between 1 and 5% below 65° C.

Shrinkage may be measured according to the following method: providing a sample with measured and marked 100 mm times 100 mm area, placing the sample for 15 seconds to the water baths having temperatures at intervals of 5° C. from 55° C. to 98° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method. The composition of heat transfer medium (air, steam, water, oil) is not critical for testing of shrinkage behaviour.

Alternatively, the shrinkage may be measured according to the following method: providing a sample with measured and marked 100 mm times 100 mm area, placing the sample for 30 seconds to the oil baths having temperatures at intervals of 10° C. from 70° C. to 150° C., taking the sample out of the oil and cooling the sample to around room temperature, drying the sample and measuring the dimensions of the marked area of the sample. Preferably at least 3 or more parallel samples are used. Shrinkage is determined as the relative change of dimensions. The term "shrinkage" is defined with reference to the method.

A heat shrink label comprises or consists of a heat shrink film and is suitable to be fitted around an article to be labelled and shrunk around the article. In addition, a heat shrink label comprises at least some graphics on a surface of the heat shrink film. A heat shrink label may be a heat shrink sleeve label (HS) or a roll-fed shrink film label (RFS). Preferably, a heat shrink label is roll-fed shrink film label, wherein the face film is uniaxially oriented in machine direction. A heat shrink film without additional graphics, such as printing, may be used, for example, as a shrinking seal label, a tamper evident label or security label.

Term "machine direction" MD refers to the running direction $S_x$ of the face film or continuous label web during label manufacturing. "Transverse direction" TD or "cross direction" CD refers to the direction $S_y$ perpendicular to the running direction $S_x$ of the film or label web. Directions are shown, for example, in FIG. 2.

Term "printable surface" refers to a surface, such as a surface of a face layer, that is suitable for printing. Printable surface is also able to maintain the printing, such as printed text and/or graphics. Printable surface has sufficiently high surface energy. A low surface energy may lead to poor retaining capability of printing ink applied to the surface. For example, the plastic film may have a surface energy at least 36 dynes/cm, preferably at least 38 dynes/cm or at least 44 dynes/cm measured according to the standard ASTM D-2578. The surface tension may be between 36 and 60 dynes/cm, preferably between 38 and 56 dynes/cm or between 44 and 50 dynes/cm. The surface tension level may also be maintained higher than or equal to 38 dynes/cm after 50 or 120 days. According to an embodiment a printable heat shrinkable face layer and a label produced thereof comprises at least one printable face layer.

1% secant modulus of elasticity, also referred to as 1% secant modulus, may be used to describe the stiffness of the material. The modulus may be referred to as the ratio of stress to elastic strain in tension. Thus, 1% secant modulus of elasticity reports to the ratio of stress to strain at 1% strain in a stress-strain diagram. A high modulus may mean that the material is rigid, in other words more stress may be required to produce a given amount of strain. 1% secant modulus values presented in the present application may be defined according to ISO 527-3 standard. Alternatively 1% secant modulus may be measured according to ASTM D882 standard.

Overlying/underlying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Adjacent refers to an arrangement, where a layer is next to another layer. Adjacent layers are in contact with each other and no additional layers are between the layers.

Topmost (outermost, uppermost, upmost) layer refers to a configuration of a label structure, where the topmost layer forms upper part of the label structure arranged opposite to the surface attaching the surface of an item when labelled. Topmost layer of a label may be, for example, a skin layer, a print layer, a top coating (over-vanishing layer).

Undermost layer refers to a surface forming bottom part of the label structure arranged opposite to the topmost surface. Undermost layer is in contact with the surface of an article when labelled. In a shrink label the undermost and topmost layer of the label structure may contact each other in a seam area where the edges of the face film are overlapping. In an example, in the seam area edges of the face film are overlapping and a first skin layer and a second skin layer are adjacent to each other. Seam is formed when the adjacent layers are bonded together. Undermost layer of a label may be, for example a skin layer, a print layer, a top coating (over-vanishing layer).

Haze is a property used to describe transparency of a plastic film or a face stock of label consisting of the plastic film. Haze relates to scattering of light by a film that results in a cloudy appearance of the film. Haze corresponds to the percentage of light transmitted through a film that is deflected from the direction of the incoming light. Haze may be measured according to standard ASTM D1003.

Structure

Shrinkable labels, also referred to as shrink labels, are shrinking under exposure to external energy, such as elevated temperature. Shrinkable labels include both shrink sleeve labels and roll-fed shrink film labels. The shrinkable label may also be one of the following: tamper evident label, security label and shrinking seal label. Shrinkable labels comprise or consist of an oriented non-annealed face film. Such oriented non-annealed film has not been specifically temperature treated to become a dimensionally stable, non-shrinking film.

A shrink label comprises or consists of an oriented and non-annealed face film, which is therefore shrinkable. The face film may be drawn (stretched) in one direction. The film may be stretched in a machine direction. Alternatively, the film may be stretched in a transverse direction. The resulting film is thus monoaxially (uniaxially) oriented (MO). Monoaxially oriented film may be machine oriented (MDO) or transverse oriented (TDO) in accordance to the direction of the orientation (stretching). The oriented film is suitable for shrinking along the direction of orientation, during exposure to external energy. Preferably, uniaxially oriented film has shrinking less than 10% or less than 5% in other directions (non-shrinking directions) of the film, during exposure to external energy. Expansion of the uniaxially oriented film may be equal or less than 5% in other directions (non-shrinking directions) of the film.

A face film may be mono-axially (uniaxially) oriented. The face film of shrink sleeve label may be mono-axially oriented in transverse direction (TD). The face film of roll-fed shrink film label may be mono-axially oriented in machine direction (MD). According to an embodiment, the face film comprises or consists of a transverse direction oriented (TDO) face film, which is non-annealed and therefore shrinkable in the orientation direction. According to another embodiment, the face film comprises or consists of a machine direction oriented (MDO) face film, which is non-annealed and therefore shrinkable in the orientation direction.

During stretching the randomly oriented polymer chains of the extruded films are oriented in the direction of stretching (drawing). Orientation under uniaxial stress provides orientation of polymer chains of the plastic film in the direction of stress provided. In other words, the polymer chains are oriented at least partially in the direction of stretching (drawing). In this application, machine direction (MD) refers to the running direction ($S_x$) of the film during manufacturing, as shown for example in FIG. 2. The degree of orientation of the polymer chains depends on the drawing ratio of the film. In other words, the polymer chains in the film stretched with a higher draw ratio are more oriented when compared to the films stretched with a lower draw ratio. The orientation, like orientation direction and ratio, may have effect on properties of the film, and/or the label comprising the film. The stretching of the film and orientation of the polymer chains may be observed microscopically.

Further, the orientation is detectable e.g. from the mechanical properties of the films, such as values of modulus and/or tensile strength.

A ratio of total film thickness before and after stretching is called a "stretch ratio" or "draw ratio" (DR). It may also be referred to as an orientation ratio. In other words, stretch ratio is a ratio of non-oriented (undrawn) film thickness to the oriented (stretched) film thickness. The non-oriented film thickness is the thickness after extrusion and subsequent chilling of the film. When stretching the film, the thickness of the film may diminish in the same ratio as the film stretches or elongates. For example, a film having thickness of 100 micrometres before uniaxial orientation is stretched by a stretch ratio of 5. After the uniaxial orientation the film may have a fivefold diminished thickness of 20 micrometres. Thus, the stretch ratio (orientation ratio) of the film is 5.

A face film of a shrinkable label may have a monolayer structure. Alternatively, a face film may have a multilayer structure comprising two or more layers. A multilayer face film may have a three layer structure. Alternatively, a multilayer face film may comprise five or even more layers. Preferably, a multilayer face film includes a core layer and equal number of skin layers on both sides of the core layer. For example, a five layer structure comprises a core layer and two skin layers on both sides of the core. For example, a multilayer structure may comprise tie-layers. It is also possible that a multilayer structure includes several core layers.

Figure 2:
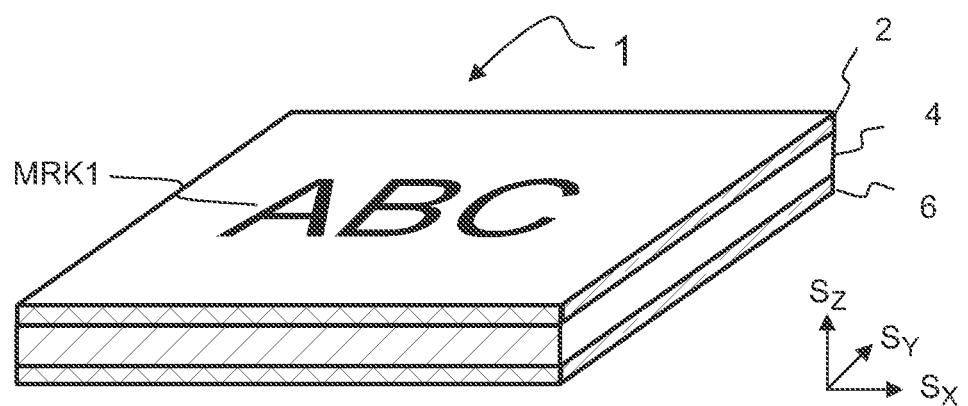
FIG. 2 shows, in a perspective view, an example of a multilayer face film for a label.

Referring to FIG. 2, a multilayer face film structure has a three layer structure. In a three layer structure, a core layer 4 is an intermediate layer. Skin layers 2,6 may be adjoined to the core layer 4. The first skin layer 2 and the second skin layer 6 may also be referred to as a front surface layer and a back surface layer, respectively. The front surface layer may be an outermost layer of the multilayer structure when labelled to a surface of an item. However, the front surface may further be over coated i.e. over-vanished. For example, in order to protect the printed graphics. The back surface layer may be the layer adjacent to a surface of an item. In an example, at least one of the back surface layer and the front surface layer comprises graphics, such as printed information or decoration. Further, the surface layer(s) comprising graphics may be over-coated, for example over-vanished in order to protect the graphics.

Preferably a multilayer face film has a symmetric structure. For example, symmetric three layer face film comprises identical, or nearly identical skin layers on opposite sides of the core layer. Symmetric structure may have effect on quality of the shrunk face film and a shrunk label comprising said face film. For example, wrinkles and curling of the face film may be avoided. Alternatively, a multilayer face film may be asymmetrical. For example, one skin layer may have more or less additives, e.g. anti-block or slip-agent, than the other skin layer. A face film structure may also comprise additional layers, such as tie layers or protective layers. The multilayer face film may also have asymmetry with respect to the skin layer thickness. In other words, there might be some thickness difference between the skin layers, for example in a three layer structure comprising two skin layers the skin layers may have different thickness. A multilayer structure may be laminated or coextruded.

A core layer 4 may form major portion of the multilayer film structure. The core layer may be thicker than the first skin layer and the second skin layer. For example, the core may form from 60% to 90% of the total thickness of the multilayer structure. In an example, a three layer film has a construction 10%/80%/10% for first skin/core/second skin, respectively. In an example, a three layer film has a construction 20%/60%/20% for thickness of first skin/core/second skin, respectively. Thickness of the core layer may be from 10 to 50 microns, or from 20 to 40 microns. Thickness of each skin layer may be from 5% to 20% of the total thickness of the multilayer structure. The thickness of a skin layer may be less than 15 microns, preferably around 10 or 7.5 microns or less. The overall thickness of the multilayer film may be from 20 to 70 microns or from 25 to 60 microns, preferably around 50 microns or around 40 microns or less.

Preferably a multilayer film has uniform overall thickness. Uniform thickness refers to a homogeneous thickness of the film, wherein a thickness variation along the film is small. For example in a film area of 100 mm*100 mm variation of the film thickness is less than 10%, preferably between 0.1 and 5.0%. Uniform thickness of the film provides better quality labels, for example, labels having good visual appearance. Uniform film thickness may have effect on the register control and image quality of the printing.

Figure 7:
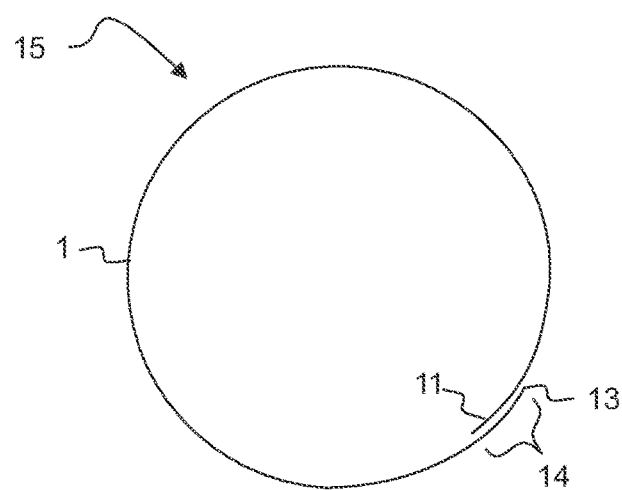
FIG. 7 shows, in a cross-sectional view, an example embodiment of a seamed shrink label.

Preferably, a shrink label, such as a heat shrink label, comprises or consist of a multilayer face film. In addition, the shrink label may comprise at least some graphics on a surface of the face film. In addition, the shrink label may comprise an adhesive e.g. hot melt adhesive. The adhesive may be applied in a joint area, also referred to a seam area, of cylindrical label, wherein the opposite edges of the face film are overlapping. For example, the adhesive may be applied between the overlapping edges. Referring to FIG. 7, an adhesive may be applied between a trailing edge 13 and a leading edge 11 of a face film 1. When rolling the face film 1 over itself, the trailing and leading edges overlap and form a seam 14. Alternatively, seaming may be provided by hot-seaming with a hot bar. Also other seaming methods like laser, or ultrasonic radiation may be used. In addition, adhesive (e.g. hot melt adhesive) may be used to hold the label on the surface of the item to be labelled. The adhesive may be applied on the label or on the item in an area between the leading edge and the surface of the item.

According to an embodiment, a shrink label is a shrink sleeve label, such as heat shrink sleeve label. The shrink sleeve label is in a form of tubular sleeve comprising a face film 1 which is oriented uniaxially in a transverse direction ($S_Y$). A shrink sleeve label is formed by seaming a first longitudinal edge 8 and a second longitudinal edge 12 of the face film 1 extending parallel to a machine direction of the face film ($S_x$). In other words, the face film is rolled around the axis extending in the machine direction ($S_x$) of the face film and the seam 14 is formed between the overlapping longitudinal edges 8,12 of the face film 1. Seaming may be provided, for example, by hot-seaming with a hot bar. Such a preformed sleeve tube may be further rolled into a roll and provided for separate labelling process.

Figure 3:
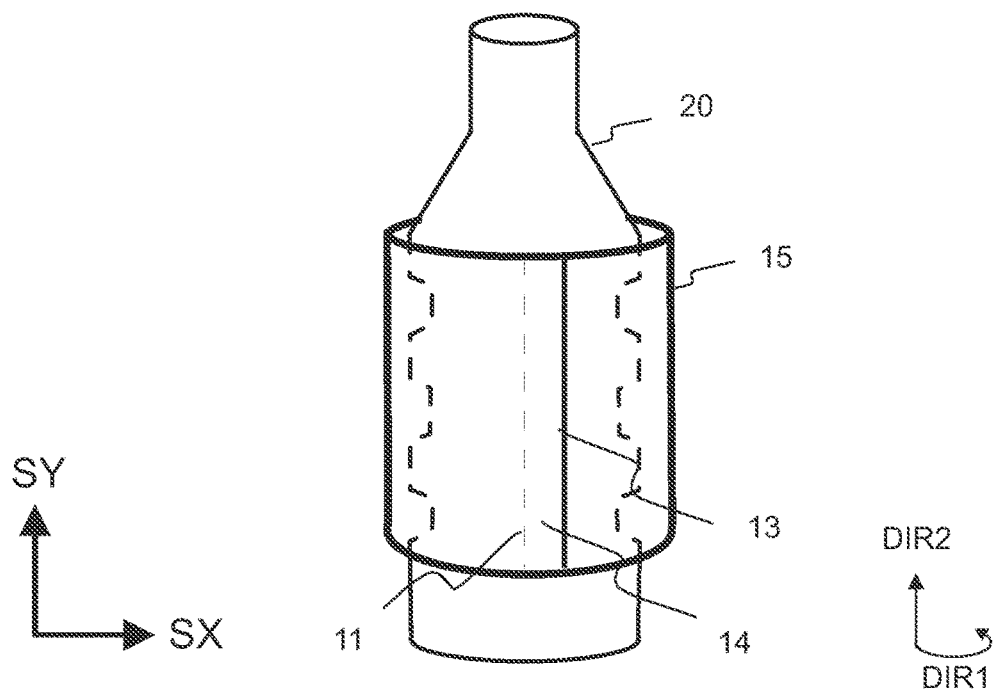
FIG. 3 shows an example of a shrink label around an article (before shrinking)
Figure 4:
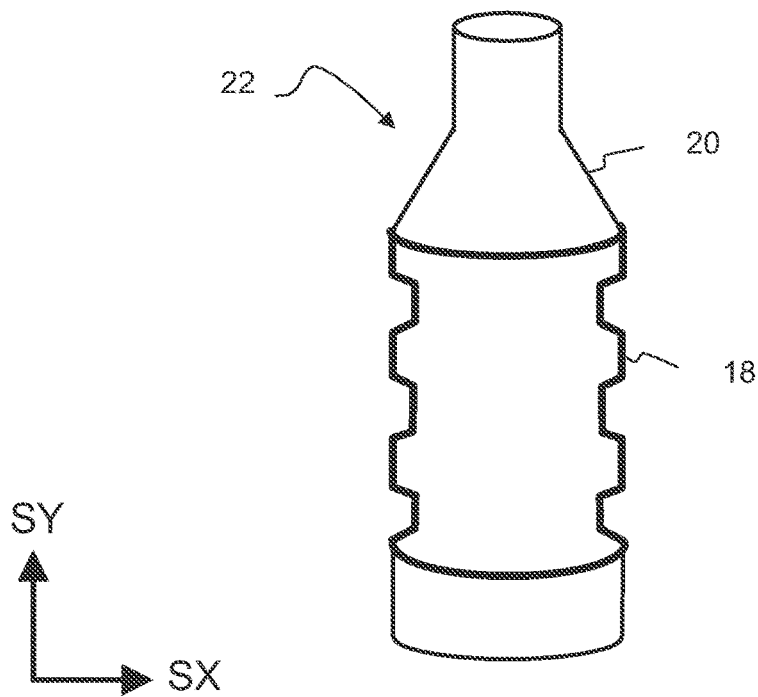
FIG. 4 shows an example of a label fitted on a surface of an article i.e. labeled article comprising a shrunk label (after shrinking)

According to another embodiment, a shrink label is a roll-fed shrink film label comprising a face film 1 which is oriented uniaxially in a machine direction ($S_x$). Referring to FIG. 3 a roll fed shrink film label 15 is formed on-line around an article to be labelled or around a mandrel by seaming a leading edge 11 and a trailing edge 13 of the face film. Preferably, the shrink film label is formed around a mandrel. In other words, the face film is rolled around the axis extending in the transverse direction ($S_y$) of the face film. A label comprises a seam 14 between the overlapping leading edge 11 and trailing edge 13 of the face film. The seam extends perpendicular to the uniaxial orientation direction of the face film. If the label is formed around a mandrel it is further transferred to an article to be labelled. Again, typically the face film 1 has been provided its visual appearance and information during earlier converting steps. The shrink film label 15 is able to shrink in the direction DIR 1 during application of external energy, such as heat. FIG. 4 shows a shrunk label 18 around an item 20.

Materials for Shrinkable Face Films and Labels Produced Thereof

The shrinkable face film structures may comprise at least some of the following materials:

Propylene terpolymer(s) may be used for skin layer(s) of a multilayer face film structure and labels produced thereof. Propylene terpolymer(s) refers to copolymer(s) comprising three distinct monomers, of which one is propylene. Other monomers may be ethylene, 1-butene, 1-hexene or 1-octene. Propylene terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene.

Propylene terpolymer(s) may have density 0.90 g/cm$^3$, when measured according to standard ISO 1183. Melt flow rate may be between 0.9 and 7.5 g/10 min, when measured according to standard ISO 1133 at 230 degrees C./2.16 kg. Melting temperature may be between 127 and 137 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 137 degrees C. (ISO 11357-3).

In an example, propylene terpolymer comprises density of 0.90 g/cm$^3$, when measured according to standard ISO 1183. Melt flow rate may be 6 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 0.9 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 7.5 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 127 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 128 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 130 degrees C. (ISO 11357-3).

Heterophasic polypropylene block copolymer(s) also referred to as heterophasic copolymer(s), such as heterophasic polypropylene/propylene-ethylene copolymer(s) or heterophasic polypropylene block copolymer comprising composition of butene/ethene/propene may be used for a core and/or skin layers of a multilayer face film structure and labels produced thereof. Heterophasic polypropylene copolymers refer to multiphase structures comprising crystalline polyolefin fraction and an elastomeric polyolefin fraction, for example a propylene matrix and inclusions therein comprising elastomeric phase. The heterophasic morphology may consist of ethylene-propylene (EP) domains (i.e. ethylene-propylene copolymer as dispersed phase) in polypropylene matrix. The crystallizable fragments of ethylene/propylene copolymer, when present, may be incorporated as inclusions into the amorphous EP domains.

Heterophasic copolymer(s) may have melt flow rate MFR (at 230° C./2.16 kg) between 0.6 and 27 g/10 min, when measured according to ISO 1133. Density may be between 880 and 905 kg/m$^3$. Melting temperature may be between 140 and 170° C., when measured according to standard ISO 11357-3.

In an example, heterophasic copolymer may have melt flow rate MFR (at 230° C./2.16 kg) of 0.8 g/10 min, when measured according to ISO 1133. Density may be of 905 kg/m$^3$. A XS content may be of 28 wt. %, referring to xylene soluble species in the propylene copolymer. Ethylene content may be 15.5 wt. %. Melting temperature may be 140° C., when measured according to standard ISO 11357-3.

In an example, heterophasic copolymer may have melt flow rate MFR (at 230° C./2.16 kg) of 0.85 g/10 min, when measured according to ISO 1133. Melting temperature may be 166° C., when measured according to standard ISO 3146.

In an example heterophasic copolymer may have melt flow rate MFR (at 230° C./2.16 kg) of 3.0 g/10 min, when measured according to ISO 1133. Melting temperature may be 168° C., when measured according to standard ISO 11357-3.

Preferably the heterophasic propylene-ethylene copolymers presented in the following may be used for the core layer:

In an example heterophasic copolymer may have density of 0.88 g/cm$^3$, when measured according to standard ISO 1183. Melt flow rate MFR (at 230° C./2.16 kg) may be 0.6 g/10 min, when measured according to ISO 1133. Melting temperature may be 140° C., when measured according to standard ISO 11357-3. Vicat softening temperature may be 60° C., when measured according to standard ISO 306 (A50 (50° C./h 10N)).

In an example heterophasic copolymer may have melt flow rate MFR (at 230° C./2.16 kg) may be 27 g/10 min, when measured according to ISO 1133. Vicat softening temperature may be 72.8° C., when measured according to standard ISO 306 (A50 (50° C./h 10N)).

In an example heterophasic copolymer may have density of 0.89 g/cm$^3$, when measured according to standard ISO 1183. Melt flow rate MFR (at 230° C./2.16 kg) may be 7.5 g/10 min, when measured according to ISO 1133. Vicat softening temperature may be 94° C., when measured according to standard ISO 306 (A50 (50° C./h 10N)).

In an example heterophasic copolymer may have density of 0.89 g/cm$^3$, when measured according to standard ISO 1183. Melt flow rate MFR (at 230° C./2.16 kg) may be 9.5 g/10 min, when measured according to ISO 1133. Melting temperature may be 147° C., when measured according to standard ISO 11357-3. Vicat softening temperature may be 112° C., when measured according to standard ISO 306 (A50 (50° C./h 10N)).

In an example heterophasic copolymer may have density of 0.89 g/cm³, when measured according to standard ISO 1183. Melt flow rate MFR (at 230° C./2.16 kg) may be 6 g/10 min, when measured according to ISO 1133. Vicat softening temperature may be 89° C., when measured according to standard ISO 306 (A50 (50° C./h 10N)).

In an example heterophasic copolymer may have composition of but-1-ene, ethene, prope-1-ene. It may have density of 0.900 g/cm³, when measured according to standard ISO 1183. Melt flow rate MFR (at 230° C./2.16 kg) may be 6.5 g/10 min, when measured according to ISO 1133. Vicat softening temperature may be 144° C., when measured according to standard ISO 306 (A50 (50° C./h 10N)).

Preferably, the following heterophasic propylene-ethylene copolymers may be used for the skin layer(s):

In an example, heterophasic copolymer having melt flow rate MFR (at 230° C./2.16 kg) of 0.8 g/10 min, when measured according to ISO 1133. Density may be of 905 kg/m³. A XS content may be of 28 wt. %, referring to xylene soluble species in the propylene copolymer. Ethylene content may be 15.5 wt. %. Melting temperature may be 140° C., when measured according to standard ISO 11357-3.

In an example, heterophasic copolymer having melt flow rate MFR (at 230° C./2.16 kg) of 0.85 g/10 min, when measured according to ISO 1133. Melting temperature may be 166° C., when measured according to standard ISO 3146.

In an example heterophasic copolymer having melt flow rate MFR (at 230° C./2.16 kg) of 3.0 g/10 min, when measured according to ISO 1133. Melting temperature may be 168° C., when measured according to standard ISO 11357-3.

In an example heterophasic copolymer may have composition of but-1-ene, ethene, prope-1-ene. It may have density of 0.900 g/cm³, when measured according to standard ISO 1183. Melt flow rate MFR (at 230° C./2.16 kg) may be 6.5 g/10 min, when measured according to ISO 1133. Vicat softening temperature may be 144° C., when measured according to standard ISO 306 (A50 (50° C./h 10N)).

Random copolymer of propylene may be used for a core and/or skin layer(s). Random copolymer of propylene with ethene may have density between 0.89 and 0.91 g/cm³.

In an example, random copolymer of propylene with ethene may have density of 0.9 g/cm³, when measured according to standard ISO 1183. Melt flow rate MFR (at 230° C./2.16 kg) may be 1.7 g/10 min, when measured according to ISO 1133.

In an example, random copolymer of propylene with ethene may have density of 0.9 g/cm³, when measured according to standard ISO 1183. Melt flow rate MFR (at 230° C./2.16 kg) may be 2.2 g/10 min, when measured according to ISO 1133. Vicat softening temperature may be 122° C., when measured according to standard ISO 306 (A50 (50° C./h 10N)).

Copolymers of alpha-olefin and alkyl acrylate, such as ethylene butyl acrylate (EBA) may be used for a core layer. Ethylene may be copolymerized with at least one co-monomer, wherein the co-monomer is an alkyl acrylate ester. The ethylene may comprise a low density polyethylene (LDPE), referring to a polyethylene having a density in the range of 0.910 to 0.940 g/cm³. Examples of preferred alkyl acrylate esters suitable for use as co-monomers comprise acrylic acid esters C1 to C8 linear or branched alcohols. For example, methyl acrylate, ethyl acrylate, n-butyl acrylate, iso-butyl acrylate, t-butyl acrylate, n-hexyl acrylate, 2-ethylbutyl acrylate, and 2-ethylhexyl acrylate may be used as co-monomers. A particularly preferred co-monomer is butyl acrylate, such as n-butyl acrylate. The copolymer of ethylene and butyl acrylate may be a block or random copolymer. A preferred copolymer of ethylene and butyl acrylate may comprise in the range of 5% to 30% by weight, preferably in the range of 5 to 25% by weight, most preferably in the range of 5 to 15% or in the range of 10 to 15% by weight of butyl acrylate monomers. For example, the copolymer of ethylene and butyl acrylate may comprise a n-butyl acrylate content in the range of 5% to 30% by weight. A copolymer of ethylene and butyl acrylate may comprise a melting temperature in the range of 96° C. to 104° C., preferably in the range of 97° C. to 103° C. A copolymer of ethylene and butyl acrylate may further comprise a melt volume rate tested according to standard ISO 1133 at 190° C. with test load of 2.16 kg in the range of 0.20 to 1.5 g/10 min, preferably in the range 0.25 to 1.4 g/10 min. A preferred copolymer of ethylene and butyl acrylate may comprise a density in the range of 0.91 to 0.93 g/cm³, preferably in the range 0.922 to 0.923 g/cm³ according to standard ISO 1183 (Method A). A copolymer of ethylene and butyl acrylate has a large shrinkage potential when compared to other alkyl acrylate monomers, such as copolymers of ethylene and ethyl acrylate or methyl acrylate. The copolymer of ethylene and butyl acrylate may be preferred, in particular, in the core layer, when combining the core layer to adjacent skin layers comprising stiffness. A core layer comprising copolymer of ethylene and butyl acrylate may be particularly suitable for objects which comprise a rigid body, which supports the shape of the object.

Polyethylene may be used for skin layer(s). In an example, the first skin layer and/or second skin layer includes polyethylene. Preferably, at least the skin layer to be printed or comprising printing includes polyethylene. Polyethylene may be used for enhancing printability of the skin layer. It may further enhance anchorage/adherence of the printing ink. Polyethylene may be, for example linear low density polyethylene (LLDPE). LLDPE refers to random copolymer of ethylene and longer chain alpha-olefins, such as butene, hexene or octene, provided by using either Ziegler-Natta catalyst or metallocene catalyst. Density of LLDPE(s) may be at least 0.92 g/cm³, for example, between 0.930 and 0.950 g/cm³. Ziegler-Natta catalyst results a semicrystalline linear polymer with a plurality of molecular weights and copolymer molecules with variety of compositions. Metallocene catalyst provides narrower molecular weight distribution. Controlled co-monomer distribution and short-chain branching distribution can also be provided. Efficient use of co-monomer has effect on providing certain density with lower amounts of co-monomers when compared to Z—N catalysed polymer. Lower amount of co-monomer has effect on toughness of the polymer. Due to the smaller crystal size and narrower distribution of the crystal sizes metallocene LLDPE further exhibits a sharp, but low melting temperature. Instead or in addition to LLDPE other grades of polyethylene may be used, such as medium density polyethylene (MDPE) or low density polyethylene (LDPE).

Additives, such as anti-blocking agent and/or slip additive may be used for skin layer(s). Total amount of anti-blocking agent compound and/or slip additive compound may be between 0.5 and 3 wt. %. An antiblocking agent compound may comprise 10% silica in propylene polymer carrier. Propylene polymer may be either propylene homopolymer or propylene copolymer. Alternatively, the compound of anti-blocking agent may comprise synthetic silica in polyethylene carrier. An amount of anti-blocking agent in the skin layer(s) may be between 0.05 and 0.3%. Alternatively, the additive may comprise particles comprising silicone resin powder with tridimensional network. Alternatively, the additive may comprise particles comprising silicone resin powder with tridimensional network and silicone rubber powder with linear structure.

Compositions for Shrinkable Face Films and Labels Produced Thereof

According to an embodiment, a face film has a structure comprising multiple layers. A face film may have a three layer structure comprising a first skin layer 2, a core layer 4 and a second skin layer 6. Alternatively multilayer face film may comprise five or more layers. Multilayer film structure comprises at least two outer skin layers. First outer skin layer also referred to as a first skin layer may be a topmost layer of the label structure. Second outer skin layer also referred to as a second skin may be an undermost layer of the label structure. At least one of the first skin layer and the second skin layer may be printed.

The multilayer plastic film structure may comprise or consist of layers having different compositions. For example, skin layer(s) may have different composition when compared to the composition of the core layer. Also first and second skin layers may have different compositions. Alternatively, the first and second skin layers may have equal compositions.

Skin Layer

According to a first embodiment, skin layer(s) of the multilayer face film comprise heterophasic polypropylene block copolymer(s). An amount for heterophasic polypropylene block copolymer(s) may be between 95 and 99 wt. %. Examples of heterophasic polypropylene block copolymer(s) suitable for the skin layer(s) are presented in previous disclosure of the materials for shrinkable face films.

According to a second embodiment, skin layer(s) of the multilayer face film comprise random copolymer of propylene. An amount for random copolymer(s) of propylene may be between 95 and 99 wt. %. Examples of random copolymer(s) of propylene suitable for the skin layer(s) are presented in previous disclosure of the materials for shrinkable face films.

According to a third embodiment, a first skin layer and a second skin layer include propylene terpolymer(s). Terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene.

An amount for propylene terpolymer(s) may be between 95 and 99 wt. %. Examples of propylene terpolymer(s) suitable for the skin layer(s) are presented above.

The skin layer composition comprising propylene terpolymer(s) may have effect on mechanical properties of the film. For example, providing optimal modulus and stiffness. It may also have effect on providing tack-free and/or glossy surface.

Additionally, the above presented skin layer(s) may include additives, such as anti-blocking agent and/or slip additive. An amount of additive(s) is preferably less than 2 wt. %, for example between 0.5 and 2 wt. %, or between 0.5 and 1 wt. %. Alternatively or in addition, the skin layer(s) may include antioxidant. An amount of antioxidant may be 0-2 wt. %

Still additionally, the skin layer(s) may include polyethylene(s), such as linear low density polyethylene (LLDPE). At least one of the skin layers may contain polyethylene(s). If the layer(s) include polyethylene the amount of other polymers are decreased so that the total weight of polymers and additives is 100. In an example, the skin layer(s) may include 50-90 wt. % of polyethylene, 8-50 wt. % propylene terpolymer(s) and 0-2 wt. % additive(s). In an example, the skin layer(s) may include 50-90 wt. % of polyethylene, 8-50 wt. % random copolymer(s) of propylene and 0-2 wt. % additive(s). In an example, the skin layer(s) may include 50-90 wt. % of polyethylene, 8-50 wt. % heterophasic polypropylene block copolymer(s) and 0-2 wt. % additive(s). In an example, the additive may be antioxidant.

According to an example the first skin layer and the second skin layer have similar compositions. Alternatively, the layers may have different compositions. For example, only one of the layers may contain polyethylene(s).

In an example one skin layer comprises heterophasic polypropylene block copolymer, propylene random copolymer or propylene terpolymer between 10 and 50 wt. % and further polyethylene between 50 and 90 wt. %. In addition the skin layer may include 0-2 wt. % of antioxidant as an additive. The another skin layer comprises propylene heterophasic polypropylene block copolymer, terpolymer or propylene random copolymer between 50 and 98 wt. %, for example 98 wt. % and further 2 wt. % of an additive, such as anti-blocking agent. The skin layer composition comprising polyethylene(s) may have enhanced printability. It may also have better print adherence.

Core Layer

According to a first embodiment, a core layer of the multilayer face film comprises copolymers of alpha-olefin and alkyl acrylate, such as ethylene butyl acrylate(s) (EBA). An amount of ethylene butyl acrylate(s) may be between 20 and 50 wt. % or between 30 and 40 wt. %. Examples of ethylene butyl acrylate(s) suitable for the core layer are presented in previous disclosure of the materials for shrinkable face films.

The core layer composition comprising ethylene butyl acrylate(s) may further include random copolymer of propylene. An amount of random copolymer of propylene may be between 50 and 80 wt. % or between 60 and 70 wt. %. Examples for random copolymer of propylene suitable for the core layer are presented in previous disclosure of the materials for shrinkable face films. The core composition may have effect on providing adequate shrinkage together with clarity and low shrink-force.

According to a second embodiment, a core layer of the multilayer face film comprises copolymers of alpha-olefin and alkyl acrylate, such as ethylene butyl acrylate(s) (EBA). An amount of ethylene butyl acrylate(s) may be between 20 and 50 wt. % or between 30 and 40 wt. %. Examples of ethylene butyl acrylate(s) suitable for the core layer are presented in previous disclosure of the materials for shrinkable face films.

The core layer composition comprising ethylene butyl acrylate(s) may further include heterophasic polypropylene block copolymer(s). An amount of heterophasic polypropylene block copolymer(s) may be between 50 and 80 wt. % or between 60 and 70 wt. %. Examples for heterophasic polypropylene block copolymer(s) suitable for the core layer are presented in previous disclosure of the materials for shrinkable face films.

According to a third embodiment, the core layer includes ethylene butyl acrylate(s) (EBA) between 5 and 50 wt. %, between 5 and 40 wt. %, between 5 and 30% or between 5 and 20%. Further the core layer includes heterophasic polypropylene block copolymer(s) or random copolymer of propylene. The amount of heterophasic polypropylene block copolymer(s) or random copolymer of propylene may be from 50 to 95 wt. %, from 60 to 95 wt. %, from 70 to 95 wt. %, or from 80 to 95 wt. %. Total amount of polymers of the core layer being 100.

Examples of Multilayer Structures for Shrinkable Face Film and a Label Produced Thereof Following are provided some examples of shrinkable face film structures and labels produced thereof. In order to provide shrinkable films the multilayer structures are drawn (stretched) in one direction. The film may be drawn either in a machine direction or in a transverse direction. The resulting film is thus monoaxially (uniaxially) oriented (MO). Monoaxially oriented film may be machine oriented (MDO) or transverse oriented (TDO) in accordance to the direction of the orientation (stretching). Monoaxial orientation ratio may be between 2 and 10, preferably between 4 and 8. Preferably, a face film is oriented uniaxially in machine direction. After uniaxial stretching (orienting), the face film is not heat set, i.e. not annealed, in order to provide shrinkage for the film.

Example 1

The multilayer structure comprises a three layer structure comprising a first skin layer and a second skin layer according to the first embodiment disclosed in previous and a core layer between the skin layers according to the first embodiment disclosed in previous.

The skin layers comprises or consists of heterophasic polypropylene block copolymer(s) between 95 and 99 wt. % and antiblocking agent compound between 1 and 2 wt. %. The core layer comprises or consists of ethylene butyl acrylate(s) (EBA) between 20 and 50 wt. % and random copolymer of propylene between 50 and 80 wt. %

Example 2

The multilayer structure comprises a three layer structure comprising a first skin layer and a second skin layer according to the first embodiment disclosed in previous and a core layer between the skin layers according to the second embodiment disclosed in previous.

The skin layers comprises or consists of heterophasic polypropylene block copolymer(s) between 95 and 99 wt. % and antiblocking agent compound between 1 and 2 wt. %. The core layer comprises or consists of ethylene butyl acrylate(s) (EBA) between 20 and 50 wt. % and heterophasic polypropylene block copolymer(s) between 50 and 80 wt. %

Multilayer face films according to examples 1 and 2 may have effect on providing high stiffness. In an example, 1% secant modulus in the orientation direction of the film is between 700 and 2000 MPa, preferably between 1000 and 2000 MPa, or most preferably between 1300 and 2000 MPa.

In addition, face films according to examples 1 and 2 may have shrinkage between 10 and 40% when exposed to an elevated temperature between 65 and 140 deg C. using dry heating. Further, the films may have good processability including, for example, low gel content, good flow properties and/or no die-build up.

Example 3

The multilayer structure comprises a three layer structure comprising a first skin layer and a second skin layer according to the second embodiment disclosed in previous and a core layer between the skin layers according to the first embodiment disclosed in previous.

The skin layers comprises or consists of random copolymer of propylene between 95 and 99 wt. % and antiblocking agent compound between 1 and 2 wt. %. The core layer comprises or consists of ethylene butyl acrylate(s) (EBA) between 20 and 50 wt. % and random copolymer of propylene between 50 and 80 wt. %

Multilayer face films according to example 3 may have effect on providing at least some of the following: high clarity, good stiffness and optimal shrinkage. For example, the haze of the face film may be between 2 and 10%, when measured according to the standard ASTM D1003. For example, 1% secant modulus in the orientation direction of the film is between 700 and 2000 MPa, preferably between 1000 and 2000 MPa, or most preferably between 1300 and 2000 MPa. For example, the shrinkage may be between 10 and 40% when exposed to an elevated temperature between 65 and 140 deg C. using dry heating.

Example 4

The multilayer structure comprises a three layer structure comprising a first skin layer and a second skin layer according to the third embodiment disclosed in previous and a core layer between the skin layers according to the second embodiment disclosed in previous.

The skin layers comprises or consists of propylene terpolymer(s) between 95 and 99 wt. % and antiblocking agent compound between 1 and 2 wt. %. The core layer comprises or consists of ethylene butyl acrylate(s) (EBA) between 20 and 50 wt. % and heterophasic polypropylene block copolymer(s) between 50 and 80 wt. %

Films according to the example 4 may have increased shrinkage and good clarity. For example, the haze of the face film may be between 2 and 10%, when measured according to the standard ASTM D1003. For example, shrinkage may be between 10 and 40% when exposed to an elevated temperature between 65 and 140 deg C. using dry heating.

Example 5

The multilayer structure comprises a three layer structure including a first skin layer and a second skin layer and a core layer between the skin layers. At least one of the skin layers include 50-90 wt. % of polyethylene(s), 8-50 wt. % of propylene terpolymer(s), random copolymer(s) of propylene or heterophasic polypropylene block copolymer(s), and at most 2 wt. %, for example 0.5-2 wt. % of additive(s). The core layer is according to the third embodiment disclosed in previous.

Manufacturing of Labels and Labelling

Manufacturing a Face Film

Non-oriented face film may be manufactured by using either a cast or blown-film extrusion process. A shrinkable face film may be obtained by stretching (drawing) the extruded face film to an extent several times its original dimension to orient the film. Stretching may also be designated as orienting. Extruded film may be stretched uniaxially in transverse direction (across the film). Alternatively, the film may be stretched uniaxially in machine direction (lengthwise).

The face film of the shrink label may be drawn (stretched) in one direction. The film may be drawn either in a machine direction or in a transverse direction. The resulting film is thus monoaxially (uniaxially) oriented (MO). Monoaxially oriented film may be machine oriented (MDO) or transverse oriented (TDO) in accordance to the direction of the orientation (stretching). Monoaxial orientation ratio may be between 2 and 10, preferably between 4 and 8. Preferably, a face film is oriented uniaxially in machine direction.

The stretching in TD may be performed by heating the continuous film web and stretching it in transverse direction on a tenter frame. The stretching may be performed below the melting temperature of the polymer and/or at or near the glass transition temperature of the polymer. Preferably the film stretching temperature is between 40 and 130° C. The stretching in MD may be performed by means of a machine direction orienter via rolls with increasing speed. The stretching occurs due to a difference in speed between the last and the first rolls. In a stretching process the rolls are heated sufficiently to bring the substrate to a suitable temperature, which is normally below the melting temperature ($T_m$), or around the glass transition temperature ($T_g$) of the polymer. In an example, orientation process temperature is between 50 and 130° C.

After uniaxial stretching (orienting), the face film is not heat set, i.e. not annealed, in order to provide shrinkage for the film. After stretching at elevated temperature the film is immediately cooled by passing the film through cooling rolls. Cooling of the film may be gradual. Cooling may be performed with one or more cooling rolls having decreasing temperature profile starting at or just below stretching temperature and decreasing gradually to around room temperature. Cooling is performed in steps and the cooling roll temperatures may be selected between 20 and 80° C. Stretching and subsequent cooling may provide suitable shrink potential for the film. Due to the shrink potential, the oriented films are able to shrink under elevated temperature towards the non-oriented state of the film. In an example, subsequent application of heat causes the oriented film to relax and the oriented film may return towards or substantially back to its original un-stretched dimensions. Thus, the oriented films primarily shrink in the orientation direction.

The uniaxially stretched and subsequently cooled films are referred to non-annealed films having shrinkage potential and ability to shrink when external energy is provided to the film. In other words, non-annealed film refers to a film which is not relaxed to become temperature stable. Non-annealed film has shrinkage potential, when e.g. temperature exceeds a certain limit. Respectively annealed film refers to film which is relaxed to have better temperature stability, for example, within a certain temperature range defined by the annealing temperature.

Referring to FIG. 1, not heat set (non-annealed), uniaxially oriented face film 1 having dimensions of length L1, width w1 and thickness d1, is arranged to shrink under application of heat so as to form a shrunk face film 10. Uniaxial orientation direction $S_x$, of the film is parallel to the film length L1 and L2. Uniaxial orientation direction may be, for example, transverse direction TD. Alternatively, uniaxial orientation direction may be machine direction MD. The corresponding film dimensions are length L2, width w2 and thickness d2 after shrinking. Under heating the uniaxially oriented film 1 is capable of shrinking in the direction of the orientation $S_x$. In other words, the length of the film reduces, when heating is applied, i.e. L1>L2. If the film is oriented only in one direction $S_x$, in the perpendicular direction $S_y$, the dimension w1 is substantially equal to w2 after heat treatment. Same applies to the labels comprising uniaxially oriented face film.

The oriented face film, i.e. shrinkable face film, may be printed in order to provide visual effect and/or to display information. Printing may be performed by using traditional printing processes, for example, flexographic, gravure offset, and digital printing methods, such as liquid-toner, dry-toner or ink-jet processes. A multilayer face film may comprise printing on a surface of a first skin layer. Alternatively the reverse side of the multilayer structure may be printed, i.e. a second skin layer may comprise printing. The graphic patterns may be printed on at least one of the outer skin layers of the multi-layered film. When printing the second skin layer of the film, the film may be referred to as reverse-printed. In reverse-printed film the printing is viewed through the multilayer face film i.e. the printing is visible through the face film. With these kind of films no further layers may be needed to protect the printing e.g. from abrasion or scratching during handling of the labelled items.

The graphics, such as printing or other type of visual coatings, may be applied in a single process or via several printing or coating steps. It is also possible that the visual coating include metallic foil or ink or similar. It is most common that the printing is provided on the inside of the sleeve label, closest side to the item to be labelled. Printing is usually subsequently over-varnished. A shrinkable label being one of the following: tamper evident label, security label and shirking seal label may be un-printed. They may be clear. Alternatively they may be pigmented or they may comprise printing.

The face film surface may be treated prior to printing. The print receiving surface may be treated by flame treatment, corona treatment, or plasma treatment in order to increase the surface tension of the surface and to enhance, for example, adhesion of the printed graphics. A low surface tension may lead to poor retaining capability of printing ink applied to the surface.

The face film may also be treated after printing. Such treatment may include, for example, over-varnishing or other coating methods to provide protection to the printing and/or adding other enhanced visual effects in addition to the information print.

Manufacturing a Shrink Label

A shrinkable face film may be used for providing shrinkable labels, also referred to as shrink labels or shrinking labels. The shrink labels are suitable for labelling of a wide range of product designs and particularly suitable for containers and products comprising curved sections, recesses and/or protrusions at their outer surface. The labels comprising heat shrink multilayer face film are suitable for items of glass, plastic, ceramics, glass, and metal. The item may comprise or consists of polyethylene terephthalate (PET). The item may have a shape of a bottle. The films of the invention may also be used for labelling of batteries.

Shrinkable labels are shrinking under exposure to external energy, such as elevated temperature. Shrink labels are referred to more particularly as heat shrink labels when shrinkable under exposure of elevated temperature i.e. heat. Shrinkable labels include both shrink sleeve labels and roll-fed shrink film labels. The shrinkable label may also be one of the following: tamper evident label, security label and shrinking seal label. The label may be a full body label, i.e. the label may cover the whole outer surface of the item labelled. Alternatively, the label may cover the item only partially. For example, a cap of the bottle may be covered with a shrinkable label.

Figure 5:
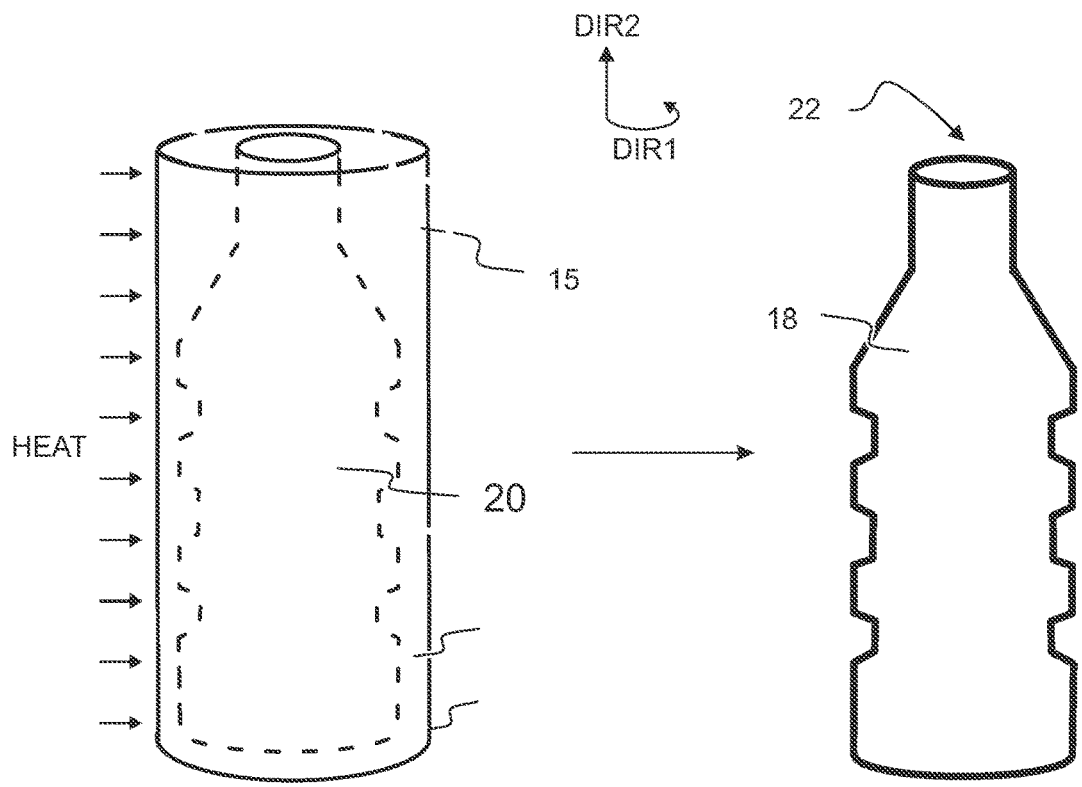
FIG. 5 shows an example of a shrink label around an article and a labeled article.
Figure 6:
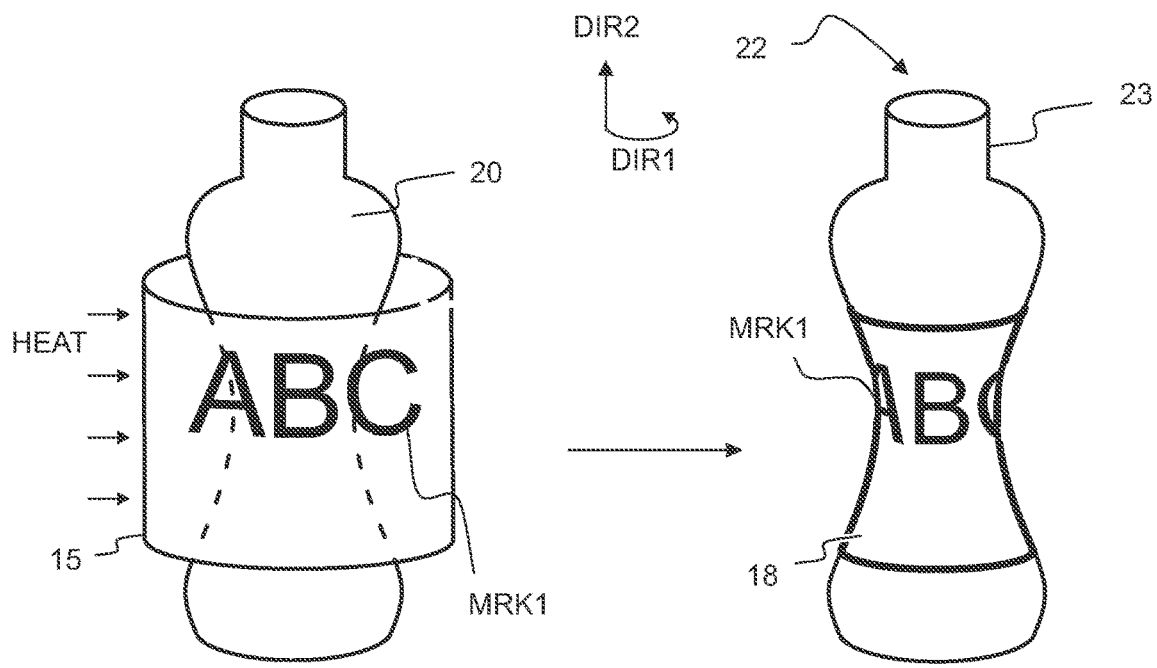
FIG. 6 shows an example of a shrink label around an article and a labeled article.

Referring to FIG. 5 a shrink label 15 may be a full body label, i.e. the shrunk label 18 may cover substantially the whole outer surface of the item 20. Alternatively, the label 15,16 may cover the item only partially, as shown in FIGS. 4 and 6. Referring to FIG. 6, for example a neck of a bottle 23 may be left without a label, or a separate and/or different label may be used for the bottle neck part than for the bottle volume part.

"Roll-fed shrink film label" (RFS) refers to a label, which is applied in an labelling process, where a ready cut face film is rolled over a container or a mandrel so as to form an individual label, which is subsequently shrunk around an article to be labelled under exposure to external energy, such as elevated temperature. Under exposure to the external energy the label is able to conform shape and size of the article. A roll-fed shrink film label comprises or consists of a shrinkable face film. The face film may be a monolayer or multilayer film. In addition, the label comprises at least some graphics on a surface of the face film.

"Shrink sleeve label" also referred to as "a shrink sleeve label" or to as "a shrinkable sleeve label" refers to a label in the form of tubular sleeve 16. Individual labels may be cut form the continuous tubular sleeve and fitted around an article to be labelled and shrunk around the article under exposure to external energy, such as elevated temperature. Tubular sleeve is made from a shrink face film by seaming. A shrink sleeve label comprises or consists of a shrinkable face film. The face film may be a monolayer or multilayer film. In addition, the shrink sleeve label comprises at least some graphics on a surface of the face film.

The roll-fed shrink film labelling process may be called as on-line labelling process. Roll-fed shrink films may be uniaxially oriented in machine direction (MD). When a label consists of a MDO shrink film as a face layer, and the machine direction of the face layer extends circumferentially around the item, the label is arranged to shrink primarily in the orientation direction under exposure to external energy, e.g. when heated. Subsequent shrinking process at high temperatures enables tight fitting of the label around the item. Heat shrinking may occur at a shrink tunnel, where for example hot air may be blown towards passing items. Alternatively shrinkage may be provided by hot steam, infrared radiation, or the like, or any combination of the above methods. Preferably, the shrinkage is carried out in a steam tunnel.

Figure 8:
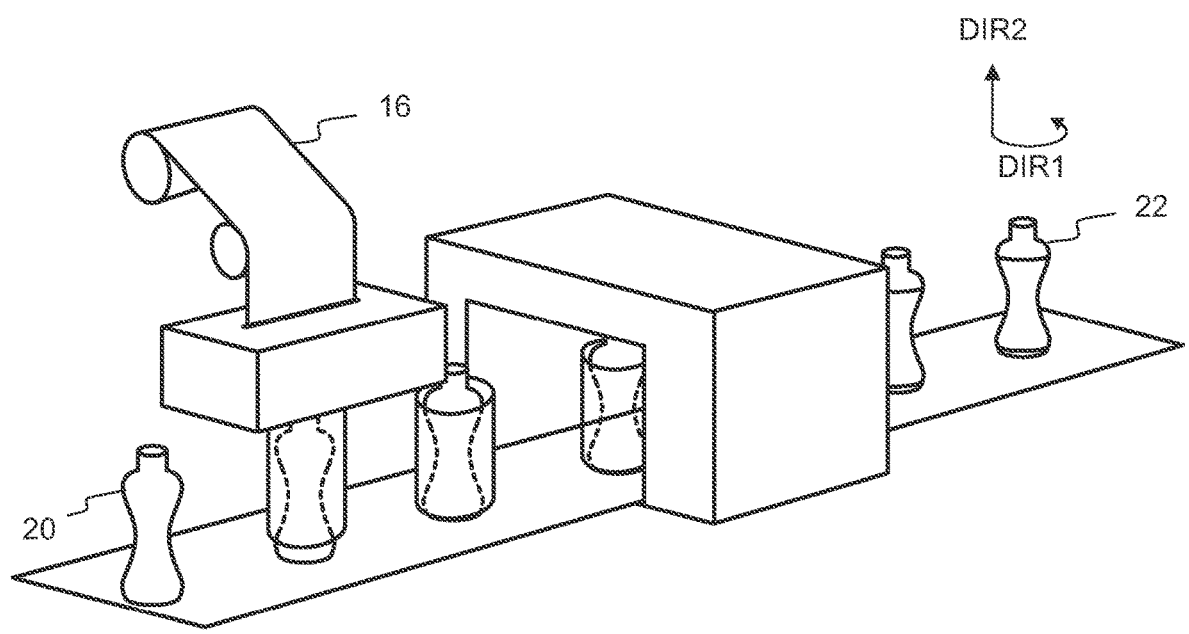
FIG. 8 shows a process for providing a shrink sleeve label and labeling of an article.

Referring to FIG. 8, "shrink-sleeve labelling" or "heat shrinkable sleeve film labelling" refers to a labelling process, where a preformed label tube (or sleeve) is introduced around an item. Shrink sleeve label comprises or consists of transverse direction oriented (TDO) shrink film. The film is seamed into a continuous tube label around the axis extending to the machine direction (Sx). Seaming may be provide e.g. by using hot-seaming with the hot bar or adhesive. The formed continuous tube (or sleeve) 16 is cut into predetermined lengths and supplied as a form of individual tube label around an item 20. The item or container may be warmed before a cylindrical tube label is introduced over it. Tube around an item is heated in order to shrink the tube label around the item so as to form a labelled item 22. The transverse direction orientation of the tube label extends circumferentially around the item. Thus, the label primarily shrinks in the transverse direction.

According to an embodiment, a method for providing a shrink label and subsequent labelling of an item may comprise at least the following steps:
  providing a multilayer face film comprising a first skin layer and a second skin layer;
  stretching the multilayer face film uniaxially in machine direction at temperature between 40 and 130° C. so as to provide uniaxially in MD oriented multilayer face film;
  cooling the uniaxially oriented multilayer face film so as to provide shrink potential in the uniaxial stretching direction;
  providing a continuous MD oriented multilayer face film to a roll, unrolling and printing the face film;
  cutting the printed face film into desired length of a label;
  wrapping the cut multilayer face film (the label comprising desired length) around a cylindrical mandrel;
  seaming the seam area so as to provide the shrink label;
  replacing the label from the cylindrical mandrel around an item to be labelled;
  applying external energy providing shrinking of the label so as to fit the label tightly around the item.

Cooling may be gradual and performed in steps comprising temperatures between 20 and 80° C. Seaming may include e.g. hot-seaming with a hot bar. Applying external energy may comprise dry heating the shrink label at temperature between 65 and 140° C. so as to form a tight fitting label around the item.

At least some/all embodiments have effect on providing good shrinkage for the face film and label comprising said film at dry heating, such as hot-air and/or IR tunnel operating temperatures. At least some/all embodiments have shrinkage between 10 and 40% at temperatures between 65 and 140 degrees C. At 50° C. shrinkage may be less than 10%, or less than 5%. The shrinkage may have effect on avoiding breaking or opening of the seam area during shrinking of the labels at the shrink tunnel temperatures between 65 and 140 deg C. or between 120 and 140 deg C.

At least some/all embodiments have effect on providing high stiffness. For example 1% secant modulus in the orientation direction of the film is between 700 and 2000 MPa, preferably between 1000 and 2000 MPa, most preferably between 1300 and 2000 MPa.

At least some/all embodiments have effect on providing no-label look or appearance, when attached to the surface of an item. The clear no-label look allows the objects beneath such label, i.e. the bottle or contents, to be visible through such label. Clarity of the film and a label comprising said film can be measured and evaluated by the haze values. The overall haze of the multilayer film and label consisting of said multilayer film may be less than 25%, preferably less than 15%, and most preferably less than 10% or less than 5%, when measured according to the standard ASTM D1003. For example, the haze of the face film between 2 and 10%, may have effect on providing good visual appearance for the face films and labels thereof. For example films comprising propylene terpolymer(s) in the skin layers and a core layer comprising heterophasic block copolymer PP and ethylene butyl acrylate may have effect on providing low haze.

At least some/all embodiments have effect on printability of the face film. The face film may have effect on enabling high printing quality. According to some/all embodiments the face film has excellent ink adhesion and register control, allowing for example gravure printing. Wetting surface tension of the print receiving skin layer may be higher than or equal to 38 mN/m, for example 44 mN/m, when measured according to standard ISO 8296. For example, the print receiving skin layer may have a surface energy at least 36 dynes/cm, preferably at least 38 dynes/cm or at least 42 dynes/cm measured according to the standard ASTM D-2578. The surface energy may be between 36 and 60 dynes/cm, preferably between 38 and 56 dynes/cm or between 42 and 50 dynes/cm. Surface energy expressed in units of dynes/cm meaning force/unit length may also be expressed in units of mN/m. Heat shrinkable labels may be used on recyclable plastic items, such as PET bottles. The recyclability of the labelled items depend on the ability to separate the labels from the items. Materials having a density less than or more than 1.00 g/cm³ may be used for separation with water. In particular, a multilayer film comprising a density less than 1.00 grams per cubic centimeter (g/cm³) may be a preferred material for thermally inducible shrinkable labels, due to floatability in water. After crushing bulky objects to small pieces, materials comprising a density of less than 1.00 g/cm³ will remain on the surface of the water, whereas materials comprising a density of more than 1.00 g/cm³ will sink due to specific gravity. Therefore, preferably polymer materials comprising a density of less than 1.00 g/cm³, such as between 0.90 and 0.98 g/cm³ may be used to obtain a multilayer film having a density less than 1.00 g/cm³, preferably between 0.90 and 0.98 g/cm³, most preferably between 0.90 and 0.95 g/cm³.

For the person skilled in the art, it will be clear that modifications and variations of the products and the methods according to the present invention are perceivable. It should be clear that aspects of the various embodiments may be interchanged both in whole or in part. The drawings are schematic. The particular embodiments described above with reference to the accompanying drawings are illustrative only and not meant to limit the scope of the invention, which is defined by the appended claims.

The invention claimed is:

1. A multilayer shrink film for a shrink label capable to shrink under exposure to external energy, the multilayer film comprising a first skin layer, a second skin layer and a core layer between the first skin layer and the second skin layer, wherein the core layer consists of 5 to 20 weight percent of a copolymer of ethylene and butyl acrylate(s) and 80 to 95 weight percent of random copolymer(s) of propylene, wherein at least one of the first skin layer and the second skin layer consists of between 50 and 90 wt. % of polyethylene, between 10 and 50 wt. % of propylene terpolymer(s), random copolymer(s) of propylene or heterophasic polypropylene block copolymer(s), and between 0 and 2 wt. % of antioxidant and wherein the multilayer shrink film has a thickness of 25 to 60 microns; and wherein the multilayer shrink film has a haze of 2 to 10%, when measured according to ASTM D1003.

2. The multilayer shrink film according to claim 1, wherein the multilayer shrink film is uniaxially oriented comprising an uniaxial orientation ratio between 2 and 10.

3. The multilayer shrink film according to claim 2, wherein the multilayer shrink film is capable to shrink in the uniaxial orientation direction of the multilayer film between 10 and 40%, when exposed to the external energy comprising temperature range between 65 and 140° C. at an atmosphere comprising low relative humidity.

4. The multilayer shrink film according to claim 3, wherein low relative humidity is less than 40%.

5. A shrink label capable to shrink under exposure to external energy, wherein the shrink label comprises the multilayer shrink film according to claim 1.

6. A combination of a shrink label and an item, wherein the shrink label comprises the multilayer shrink film according to claim 1, and wherein the item comprises polyethylene terephthalate.

7. The combination of a shrink label and an item according to claim 6, wherein the item is a bottle consisting of polyethylene terephthalate.

* * * * *